United States Patent [19]

Weber et al.

[11] 4,277,281

[45] Jul. 7, 1981

[54] CONTINUOUS FILTER FOR MOLTEN COPPER

[75] Inventors: John G. Weber; E. Henry Chia, both of Carrollton, Ga.

[73] Assignee: Southwire Company, Carrollton, Ga.

[21] Appl. No.: 67,079

[22] Filed: Aug. 16, 1979

[51] Int. Cl.³ .................................................. C22B 9/02
[52] U.S. Cl. ..................................... 75/93 R; 75/76; 164/82; 266/135
[58] Field of Search ............... 266/135, 205, 215, 217; 75/67, 68 R, 76, 93 R; 164/82, 87

[56] References Cited

U.S. PATENT DOCUMENTS

| 3,741,751 | 6/1973 | Bone | 75/67 |
| 3,743,500 | 7/1973 | Foulard | 75/67 |
| 3,843,355 | 10/1974 | Reding | 75/67 |

Primary Examiner—P. D. Rosenberg
Attorney, Agent, or Firm—Hanegan, Tate, Peacock & Linne

[57] ABSTRACT

Disclosed is apparatus for and a method of continuously filtering and optionally degassing molten copper and otherwise extracting impurities therefrom comprising disposable porous ceramic foam filtering means and means for supplying a deoxidizing or cleaning gas advantageously disposed within a chamber containing a flowing stream of molten copper.

5 Claims, 3 Drawing Figures

CONTINUOUS FILTER FOR MOLTEN COPPER

BACKGROUND OF THE INVENTION

1. Field of the Invention

The present invention relates generally to the treatment of molten copper metal, and specifically to apparatus for and a method of continuously filtering and optionally degassing molten copper and otherwise extracting impurities therefrom.

2. Description of the Prior Art

U.S. Pat. Nos. 2,429,584, 3,537,987, 3,610,600, 3,820,767, 3,904,180, 3,972,709, 4,067,731, and references therein are among numerous patents illustrating that filtering and degassing of molten metal are generally well known in the prior art. Applicants believe that until the present invention, there has been no effective system for continuously removing solid and gaseous impurities and contaminants from molten copper.

The majority of molten metal filtering and degassing technology has focused on aluminum in part because purity is particularly critical in aluminum and because the relatively low melting temperature of aluminum makes it much easier to treat than most metals. Molten aluminum treatment has progressed from batch-type slag filtering and fluxing, through in-line granular and woven refractory filtering and fluxing, to the in-line use of disposable porous ceramic foam filters such as those disclosed in U.S. Pat. Nos. 4,007,923, 3,917,242, 3,893,917, 3,962,081 and 4,092,153. Other metals, including cast iron and steel, are often degassed by a vacuum using reactive ingredient methods, while molten copper treatment technology has been limited to few improvements one being the use of catalytic action to deoxidize a melt.

Three major grades of copper recognized in the molten copper treatment industry are tough pitch copper, fire-refined copper and electrolytic copper. As used herein these terms are given what is believed to be their usual and common meanings in the industry as defined in Volume 1 of *Metals Handbook, Eighth Edition* published in 1961 by the American Society for Metals. Tough pitch copper is: "Copper containing from 0.02 to 0.05% oxygen, obtained by refining copper in a reverberatory furnace." Electrolytic copper is: "Copper which has been refined by electrolytic deposition, including cathodes which are the direct product of the refining operation, refinery shapes cast from melted cathodes, and by extension, fabricators' products made therefrom. Usually when this term is used alone, it refers to electrolytic tough pitch copper without elements other than oxygen being present in significant amounts." Fire-refined copper is: "Copper which has been refined by the use of a furnace process only, including refinery shapes and, by extension, fabricators' products made therefrom. Usually, when this term is used alone it refers to fire-refined tough pitch copper without elements other than oxygen being present in significant amounts."

Applicants believe that there is no known prior art method for continuously filtering or cleaning molten copper and for this reason, most manufacturers of cast copper products rely solely on the inherent purity of electrolytically refined copper for production of high quality castings. For molten copper known to be contaminated by refractories or the like, the only present alternative to accepting a poor quality product is scrapping the product for remelting. One example of contamination is where steel strapping normally used to bundle cathodes for shipment is inadvertently charged into a melting furnace along with the cathodes despite the normal precautions. Since our invention filters and extracts contaminants and impurities from copper, particularly, iron and calcium, by adsorption, use of the present invention immediately prior to casting negates duplication of refining effort, thereby a higher percentage of superior quality cast products can be produced from a typical melt at less overall cost. One of the main manufacturing processes which traditionally relies on the inherent purity of electrolytically refined copper is that of continuous casting and rolling of copper into rod wherein molten copper is cast into a continuously advancing mold cavity formed by at least one endless moving mold surface in conjunction with other mold surfaces so as to form a closed mold cavity. The molten copper is solidified in the shape of said mold cavity to form a cast bar which is then extracted for further processing such as rolling into copper rod suitable for drawing into wire.

It is a generally accepted principle of the casting arts that the quality of a cast product is more related to the particle size of inclusions in the matrix than to the number of inclusions and this is particularly true when the casting is intended for reduction into wire rod which will ultimately be drawn into wire for use in electrical conductor, magnet wire or telephone wire. When copper rod containing an inclusion is drawn to a point fine enough that the inclusion's diameter becomes significant with respect to the diameter of the wire a reduction in effective cross-sectional area is produced. Those in the art assume that a wire break will occur when the inclusion diameter "d" becomes an appreciable fraction of the "downstream" wire diameter. It is also generally assumed in the wire making industry that there exists a critical inclusion size "$d_c$" for a given "downstream" wire diameter and that the condition for a break is: $d \geq d_c$. Thus it is apparent that there is a need for apparatus for and a method of controlling the diameter of inclusions cast into the matrix of copper castings intended for use in the copper wire industry. A detailed analysis of this problem of the wire industry is found in "Wire Breaks In Copper: A Classification and Analysis"; Chia et al; *Wire Journal*, February, 1976.

Fire refined copper often contains many metallic and nonmetallic impurities which are detrimental to finished products such as wire made directly from fire refined copper. When fire refined copper is cast into anodes for electrolytic refining, these impurities result in heavy accumulations of waste sludge in the electrolytic reservoirs or cells. Use of the present invention as a filter for molten fire refined copper improves its quality, thereby making it acceptable for some applications without additional refining, and reduces impurities in cast anodes destined for electrolytic refining.

Another problem often occurring in the prior art is clogging of the tundish spout. The ceramic spout disclosed in U.S. Pat. No. 3,752,372 is representative of the type of spouts used to cast molten copper. Molten copper will not wet or stick to a spout of this type; however, certain impurities and contaminants such as iron will deposit on the surface of the spout, which in turn results in casting difficulties which take the form of a clogged spout which often interrupts the molten metal flow. By lowering the amount of these impurities and contaminants from the melt through the application of our invention, this problem is substantially reduced.

SUMMARY OF THE INVENTION

The present invention solves many problems caused by contamination during processing of, e.g. molten electrolytically refined copper, by serving as a final precautionary filter which removes solid contaminants introduced into the molten metal by the process itself as well as dissolved metallic and nonmetallic impurities such as iron and calcium. In addition it improves the quality of fire refined copper when used as a primary filter.

The present invention is an apparatus for and a method of continuously filtering and degassing molten copper comprising, in its basic sense, a disposable porous ceramic foam filtering means cooperating with optional degassing means disposed within a chamber through which flows a stream of molten copper. The filtering means is an open pore structure preferably having about 25 to 35 pores per linear inch and a volume fraction of voids of about 75 to 95 percent, preferably 85 to 95 percent, and is composed mainly of metallic oxides and metallic phosphates such as aluminum oxide, chromic oxide, aluminum phosphate and the like.

Additionally, we believe the ceramic foam filtering means is conditioned by exposure to the copper oxides and dissolved oxygen contained in the molten copper to enable it to extract dissolved iron from solution in the molten copper. This is believed to be accomplished by first forming a discrete layer of precipitated copper oxide upon the filtering means which layer of copper oxide causes dissolved metallic and nonmetallic impurities and contaminants such as iron and calcium to be adsorbed upon the surface of the conditioned filtering means to such an extent that reductions in concentration of dissolved metallic and nonmetallic impurities and contaminants such as iron and calcium can be effected. We believe the preferred method of practicing our invention involves passing molten copper through a chamber containing one or more of the filtering means disposed in a plane between 30 and 150 angular degrees relative to the primary direction of molten copper travel, and optionally applying degassing means to the molten copper as it passes through the filtering means.

Thus one object of the present invention is to provide an apparatus for and a method of filtering continuously flowing molten copper.

Another object of the present invention is to provide an apparatus for and a method of continuously degassing and filtering molten copper.

A further object of this invention is to provide an apparatus for and a method of improving the quality of continuously cast copper products by providing precautionary filtering and optional degassing of melted electrolytically refined copper immediately before final casting into a product.

Yet another object of the present invention is to provide an apparatus for and a method of improving the quality of fire refined copper, reducing impurity related problems in electrolytic refining of copper and reducing the need for further refining in other applications.

Still another object of the present invention is to provide apparatus for and a method of reducing the particle size of refractory impurities sometimes found in the metal matrix of copper castings.

Another object of the present invention is to provide apparatus for and a method of providing a cast copper product with substantially evenly distributed inclusions throughout the metal matrix.

Another object of the present invention is to provide apparatus for and a method of removing from copper dissolved metal and nonmetal impurities such as iron and calcium and other elements found in groups 2a and 8 of the periodic chart of the elements.

A further object of the present invention is to provide apparatus for and a method of continuously removing impurities trapped by the filter of the present invention without interrupting the flow of molten metal through the filter and without interrupting continuous casting operations.

Another object of the present invention is to provide apparatus for and a method of continuously adjusting the oxygen content of molten copper during continuous casting.

BRIEF DESCRIPTION OF THE DRAWING

While the specification concludes with claims particularly pointing out and distinctly claiming the subject matter which is regarded as the invention, it is believed that the invention, objects, features and advantages thereof will be better understood from the following description taken in connection with the accompanying drawing in which:

DESCRIPTION OF THE PREFERRED EMBODIMENT

Figure 1:
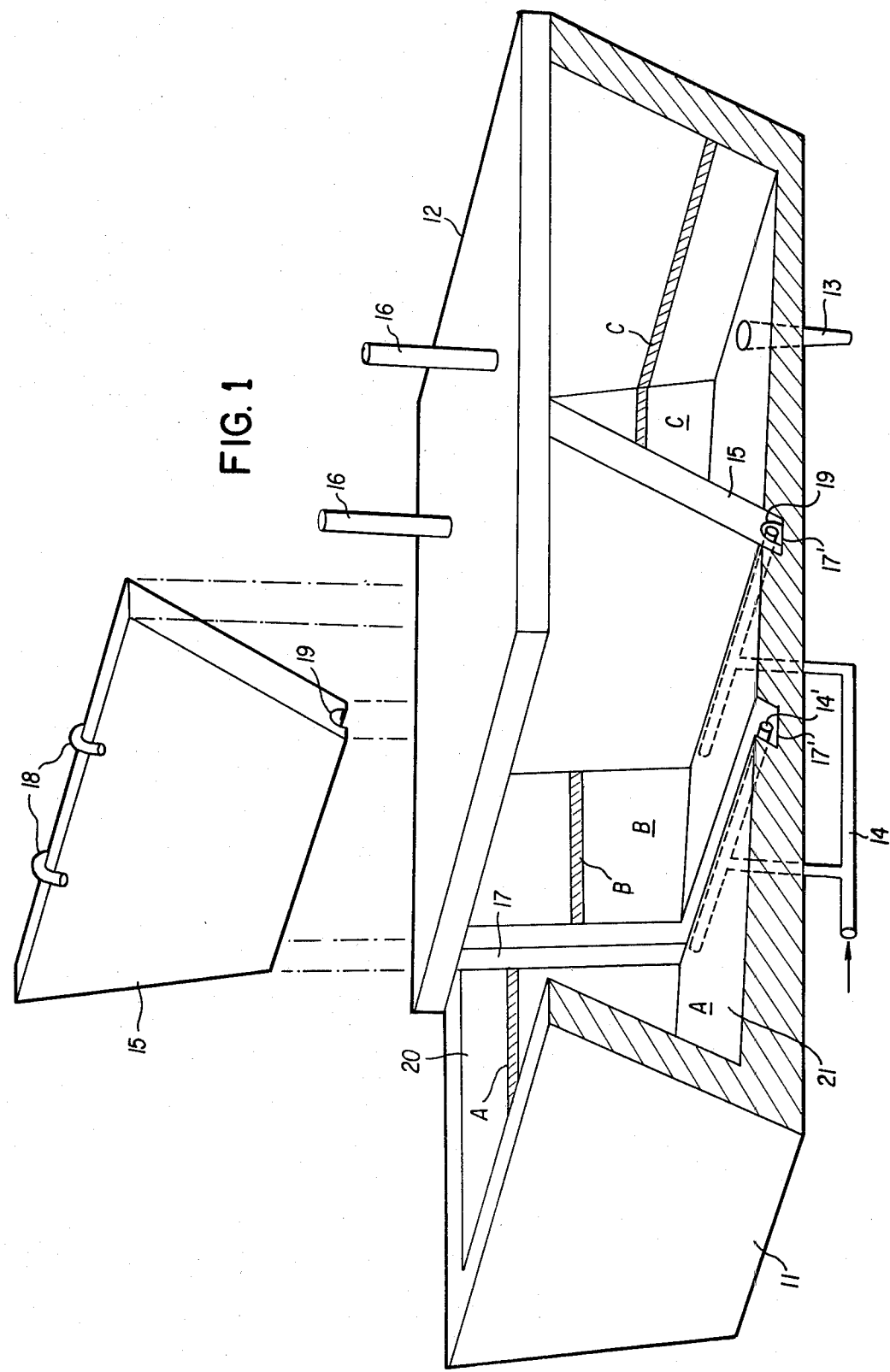
FIG. 1 is a schematic sectional view of the present invention adapted to a tundish for handling the continuous flow of molten copper.
Figure 2:
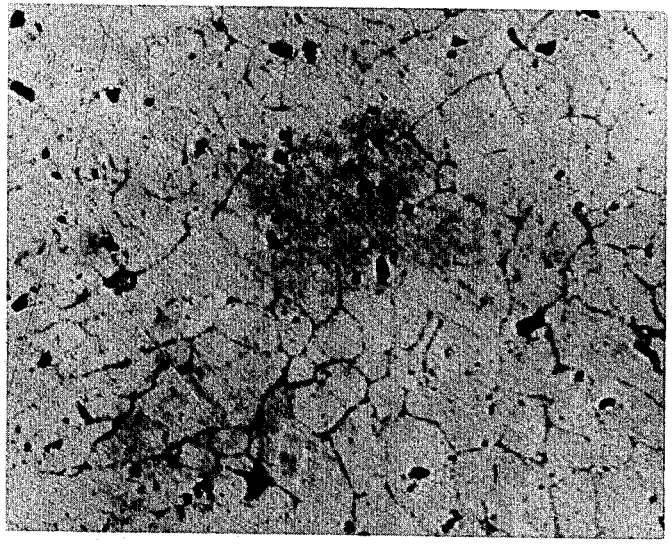
FIG. 2 is a photomicrograph, at a magnification of 400×, of a copper specimen which was cast without benefit of the present invention.
Figure 3:
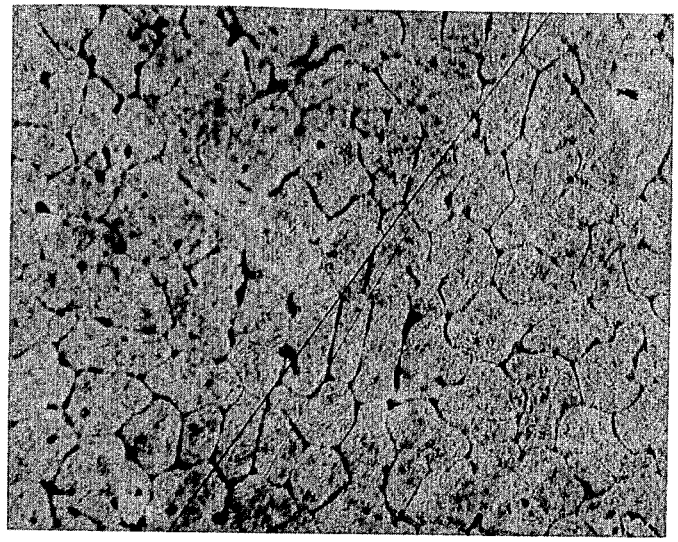
FIG. 3 is a photomicrograph, also at a magnification of 400×, of a similar copper specimen which was cast using the present invention.

Referring now in detail to the drawing, there is illustrated in FIG. 1 a tundish 11 of the type commonly used intermediate a melting or refining furnace (not shown) and a continuous or semi-continuous casting machine (not shown). Molten copper, usually above 2000° F., is poured into one end (left end of FIG. 1) of the tundish through the open top and flows toward a pouring spout 13, such as the one disclosed in U.S. Pat. No. 3,752,372, located in the opposite end. Angularly disposed in the flow path of the molten copper is at least one filter element 15 which is positioned so as to be easily removable from the top of the tundish yet tightly fitted when seated to the bottom of the tundish. The filter element 15 may be a type of ceramic foam known in the art by the trade name "Selee" foam, marketed by the Consolidated Aluminum Corporation of St. Louis, Mo. and in the preferred embodiment of the present invention such filter elements 15 are disposed in a plane between 30 and 150 degrees relative to the primary direction of travel of molten copper from its entry into the tundish 11 to its exit therefrom through pour spout 13. In FIG. 1 filter elements 15 are disposed in a 90 degree plane. Each filter element 15 is an open pore structure preferably having about 25 to 35 pores per linear inch and a volume fraction of voids of about 75 to 95 percent, preferably 85 to 95 percent. Each filter element is composed mainly of aluminum oxide and other metallic oxides and phosphates.

We believe the metallic oxide and/or phosphates from which the porous ceramic foam filter element 15 is made is conditioned by exposure to heat and/or the copper oxides and dissolved oxygen contained in the molten copper to withdraw dissolved iron from solution in the molten copper. We believe this first forms a discrete layer of copper oxide upon the filter element 15 which layer of copper oxide causes dissolved iron and calcium to be adsorbed upon the surface of the conditioned filter element 15 to such an extent that reductions in concentration of dissolved iron and calcium of up to fifty percent can be effected. Similar ceramic foam materials are known in the art and are described, for example, in U.S. Pat. Nos. 3,090,094 and 3,097,930, although we do not believe our particular application of these ceramic foam materials has been previously known.

In our preferred embodiment filter element 15 is generally in the shape of a trapezoid being so shaped to promote easy mounting in mounting grooves 17 which are inscribed in the downwardly sloping and coverging sidewalls 20 of tundish 11. Each mounting groove 17 (two, for example, forming three subchambers A, B, C are shown in FIG. 1) inscribed in bevelled sidewalls 20 corresponds to and is interconnected with bottom mounting grooves 17' (two shown in FIG. 1) formed in the floor 21 of tundish 11, the interconnection of 17-17'-17 forming a wide-topped "u" shaped groove open at the top of tundish 11. Filter element 15 when removably placed in mounting grooves 17-17'-17 fills the u-shaped groove and is oriented across the direction of molten copper flow. Handling means 18 are attached to the long top edge of trapezoidal filter element 15 to facilitate easy removal of filter element 15 from the tundish 11 even when tundish 11 is filled with continuously flowing molten copper.

In addition to filtering the molten copper, which eliminates or breaks up any large slag inclusions or impurities, the present invention contemplates the addition of a gas stream through filter element 15 to either control the oxygen content of the copper, degas the copper, or both, and to simultaneously purge filter element 15 of oxides and other refractory inclusions trapped therein by the filtering action. For example, each bottom mounting groove 17' has mounted therein a gas delivery tube 14' which is an extension of gas delivery manifold 14. A channel 19 may be formed in the bottom of each filter element 15 to receive and encase gas delivery tube 14'. Gas delivery tube 14' is perforated along its entire length so that reducing gasses such as ammonia or carbon monoxide or oxidizing gasses such as oxygen or air may be introduced into molten copper contained in tundish 11 and percolated up along and through porous filter element 15 to the surface of the molten metal pool contained in tundish 11 where unreacted gasses are vented to the atmosphere through the open tundish entrance or through vent means 16 which project through removable cover 12 from the area above the surface of the molten metal in tundish 11. In one embodiment of the present invention an inert carrier gas such as nitrogen or argon is mixed with the reducing or oxidizing gasses to perform the additional function of purging the filter element 15 of oxides and other refractories trapped therein or thereon as the molten copper is being either oxidized or reduced. In another embodiment of the present invention means for creating a vacuum may be attached to vent means 16 to create a vacuum in the space between the surface of the molten copper and cover 12 to induce any gasses dissolved in the molten copper to be expelled from the copper thereby reducing the gas-induced porosity of a cast product produced from the molten copper so treated. Where it is not desirable to reduce copper oxides which are in solution in the molten metal an inert gas may be used alone to transport undissolved copper oxides trapped by filter element 15 to the top of the molten metal pool. A major benefit of using a gas stream directly beneath filter element 15 is the increased cleansing action of the gas bubbles as they flow through the filter because the porosity of filter element 15 effectively increases the surface areas of both the gas and the molten metal thereby increasing the contact efficiency of the purifying gas exponentially and also causing particles trapped in filter element 15 to be carried towards the top of the tundish 11 where they may, if necessary, be periodically removed by skimming. While the filter element 15 may be mounted at any suitable location in the molten copper flow, for example in a launder (not shown) between the melting furnace (not shown) and the tundish 11, we believe there are advantages to locating it as close as practical to the pouring spout 13.

In the simplest embodiment of the invention the filter element 15 is 90° to the flow path but, preferably, the filter element 15 should be disposed in the flow path at an angle between about 30° and 150°. This provides for a larger effective filter area for any given size of flow channel. For example a commonly used launder has a cross-sectional area of about one square foot through which flows molten copper at a rate of about two cubic feet per minute. So that this, desired, flow rate is not significantly impeded, the filter 15 should be kept relatively thin, about two inches thick, or the effective surface area could be increased by disposing the filter element 15 at an angle to the normal direction of flow. An angle of 30° or 150° more than doubles the effective area of the filter element 15. This problem is not as great when the filter element 15 is located in a tundish, as they usually have larger cross-sectional areas and lower flow rates, but in that case an angularly disposed filter element 15 will have a longer service time before becoming clogged with adsorbed metals.

While the invention has been illustrated and described as embodied in an arrangement for use in a tundish it is not intended to be limited to the details shown, since various modifications, application and structural changes may be made without departing from the spirit and scope of the present invention.

Without further analysis, we believe the foregoing will fully reveal the gist of the present invention so that others can, by applying current knowledge or reasonable experimentation, readily adapt it for various applications without omitting features that, from the standpoint of prior art, fairly constitute essential characteristics of the generic or specific aspects of this invention and, therefore, such adaptations should and are intended to be comprehended within the meaning and scope of equivalence of the following claims.

What is claimed is:

1. A method for purificatory filtration of molten copper, comprising:
    flowing a stream of molten copper through a ceramic foam filter initially comprising aluminum oxide and phosphate and being adsorptive of iron and calcium in the presence of molten copper, to substantially remove entrained inclusions and to substantially reduce the concentration of dissolved iron and calcium impurities.

2. In apparatus for continuous casting of copper including a continuously advancing mold cavity formed by at least one endless moving mold surface acting in conjunction with at least one other mold surface to form a closed cavity wherein molten copper is solidified in the shape of said mold cavity to form a cast bar, the improvement comprising:

in combination with said continuous casting apparatus, a tundish adapted to direct a stream of molten copper to said mold; and a filter interposed within said tundish in the flowpath of said molten stream, said filter being a ceramic foam material initially comprising aluminum oxide and phosphate and being adsorptive of iron and calcium in the presence of molten copper, whereby upon said molten stream passing through said filter entrained inclusions are substantially removed and the concentration of dissolved iron and calcium impurities is substantially reduced.

3. The method of claim 1 or the apparatus of claim 2 wherein said ceramic foam filter predominately comprises oxides and phosphates of aluminum and chromium.

4. The method or the apparatus of claim 3 wherein said filter is further characterized by a pore size of about 25 to 35 pores per linear inch and a porosity of about 75 to 95%.

5. The method or the apparatus of claim 3 further comprising means for contacting said molten stream with reactive and inert gases while flowing through said filter.

* * * * *